(No Model.)
W. H. HACKETT.
COTTON PLANTER.
No. 330,393. Patented Nov. 17, 1885.
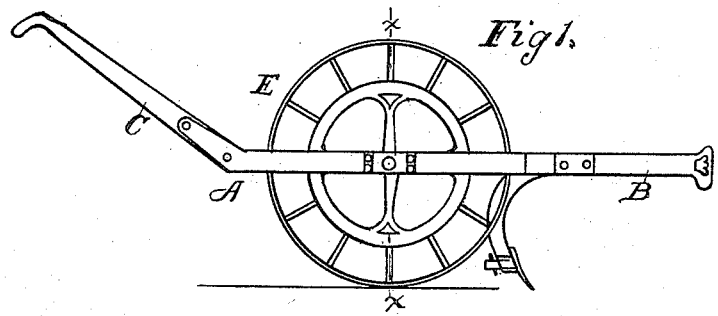
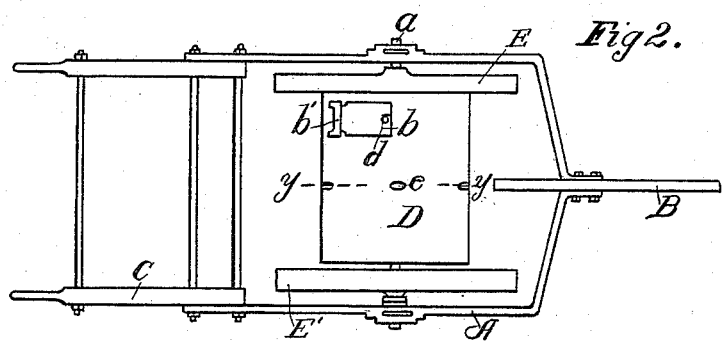
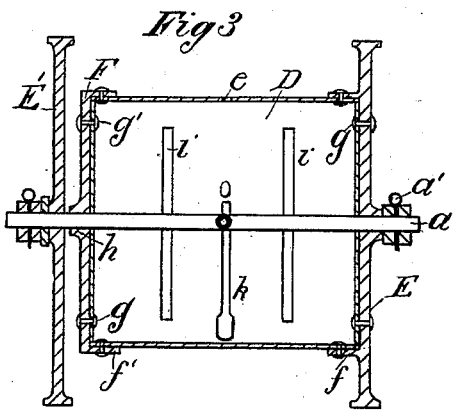
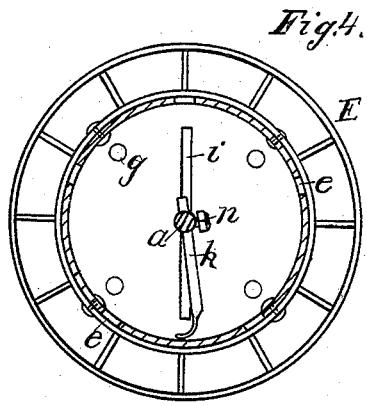
WITNESSES
Chas. S. Jones.
A. R. Brown.
INVENTOR
William H. Hackett.
By E. Chandler,
Attorney

United States Patent Office.

WILLIAM H. HACKETT, OF ATLANTA, GEORGIA, ASSIGNOR TO WILLIAM S. THOMSON, OF SAME PLACE.

COTTON-PLANTER.

SPECIFICATION forming part of Letters Patent No. 330,393, dated November 17, 1885.

Application filed December 24, 1884. Serial No. 151,095. (No model.)

*To all whom it may concern:*

Be it known that I, WILLIAM H. HACKETT, a citizen of the United States, residing at the city of Atlanta, in the county of Fulton and State of Georgia, have invented certain new and useful Improvements in Cotton-Planters, of which the following is a specification, reference being had therein to the accompanying drawings.

This invention relates to certain improvements in that class of agricultural implements known as "cotton-planters," the object being to improve that part of the apparatus which carries the seed and deposits it in the furrow formed by another part of the machine for its reception, all as will be hereinafter fully described, and specifically stated in the claims.

In the accompanying drawings, which form a part of this specification, Figure 1 is a side elevation of a machine embodying my improvements. Fig. 2 is a plan of the same. Fig. 3 is a section through the seed-drum on the line $x\,x$ of Fig. 1. Fig. 4 is a section of the drum on the line $y\,y$ of Fig. 2.

Similar letters of reference indicate like parts in the different figures.

A represents the side bars or frame of the machine; B, the beam, and C the handles. As these form no part of my invention, a detailed description of their construction is unnecessary. Crossing the machine transversely is an axle, $a$, which is secured in place by passing its ends through horizontal holes in the side frames, A, and then inserting the vertical pins $a'$ through suitable holes formed for their reception in both the frame and axle. Upon this axle is placed the seed-drum D, which is a cylindrical vessel, preferably formed of heavy sheet-iron, with a suitable opening in one of its sides for the introduction of the seed and allow the operator to properly adjust the seed-ejecting devices, which opening is closed by the door $b$, one end of said door being passed beneath a loop, $b'$, and the other secured by a bolt and nut, $d$. Encircling the middle of the drum is a series of perforations, $e$, for the emission of the seed, similar to those heretofore used for the same purpose. At one end of the drum, and revolving freely upon the axle, is the wheel E. This wheel is provided upon its inner side with a series of ears or projections, $f$, which embrace the end of the drum, and are securely riveted to the cylindrical case. Another series of rivets, $g$, pass through the end of the drum and web or spokes of the wheel E, thus joining the two firmly, so that the revolutions of the wheel E as the machine is drawn forward are imparted to the drum. A stiffening-plate, F, having ears $f'$ at its periphery, which are riveted to the cylindrical case of the drum, and rivets $g'$, passing through one of its ends and the web of the plate, secure the two together in the same manner that the drum is secured to the wheel E. The plate F is also provided with an elongated hub, $h$, which encircles the axle and forms a bearing upon the axle for that end of the drum to which the plate is attached, the bearing upon the axle for the opposite end being formed by the hub of the wheel E. Another wheel, E', is placed loosely upon the axle between the hub of the stiffening-plate F and the side frame. It is therefore apparent that the wheels E and E' have an entirely independent movement upon the axle. Passing through or attached to the axle $a$ within the seed-drum are the agitators $i\,i$, two or more, as may be deemed necessary, placed at any desired points upon both sides of the series of perforations in the drum. These agitators being fixed to the axle, do not revolve, but as the drum revolves keep its contents continually stirred up, thus preventing the matting or packing of the seed. Through a suitable orifice in the axle, opposite the series of perforations in the drum through which the seed is emitted, passes the stem of the ejector $k$, adjustably secured by the set-screw $n$. The extremity of this ejector, which comes opposite the holes in the drum, is spread out and curved backward, so as to cover one or more of the holes in the drum. This ejector is so adjusted as to approach closely to the lower side of the drum, leaving just sufficient space for the seed to enter at the front of the curve, while its rear portion is brought so nearly in contact with the inner surface of the cylinder as to force the seed carried under it by the revolution of the drum out through the holes formed for their exit, thus causing a regular deposit of seed at equal intervals so long as enough remains in the drum to supply the demand.

The operation of the machine will be clear from the preceding description.

The seed is placed in the drum through the opening in its side, which is then closed by the door. Upon the rotation of the drum the seed is agitated and kept from clogging by the agitators affixed to the axle. That portion of the seed coming in contact with the curved part of the ejector passes under the same, and is forced by it through the openings in the drum and deposited in the furrow at regular intervals.

Having thus described my invention, I claim the following:

1. In a cotton-planter, the seed-drum constructed as shown and described, being securely attached to the wheel E at one end and to the stiffening-plate F at the other, and revolving upon a fixed axle, as set forth.

2. In a cotton-planter, a seed-drum constructed as described, being securely fastened at one end to the wheel E, at the other to the stiffening-plate F, in combination with a fixed axle provided with agitators, upon which axle said drum revolves, as shown and described.

3. In a cotton-planter, the seed-drum constructed as shown and described, attached to the wheel E and stiffening-plate F, in combination with a fixed axle provided with an adjustable rod for ejecting the seed through the orifices in the drum, upon which fixed axle said drum revolves, as shown and described.

4. In a cotton-planter, a seed-drum constructed as shown and described, rotating upon a fixed axle which is provided with agitators and an adjustable ejector-rod, all arranged for joint operation, as shown and described.

In testimony whereof I affix my signature in presence of two witnesses.

WILLIAM H. HACKETT.

Witnesses:
THOMAS L. COOPER,
H. P. BLOUNT.